United States Patent Office 2,834,687
Patented May 13, 1958

2,834,687

CONTROL OF NAVEL BITTER IN DEHYDRATED JUICE PRODUCTS

Horton E. Swisher, Upland, Calif., assignor to Sunkist Growers, Inc., Los Angeles, Calif., a corporation of California No Drawing. Application April 19, 1954
Serial No. 424,271

9 Claims. (Cl. 99—206)

This invention relates to the utilization of navel oranges in the production of essentially nonbitter dehydrated orangeade and orange juice products.

More particularly it applies to the treatment of navel orange juice by increase of pH, concentration, drying and addition of a solid organic edible acid to the dried product to restore a desirable acidity upon reconstitution with water.

Navel oranges, particulary those which are not completely mature, contain a precursor of the bitter principle which develops in navel juice shortly after it has been extracted from the fruit. While freshly extracted juice is not bitter, an objectionable taste begins to develop soon after extraction and becomes more noticeable with the passage of time. The period within which a juice reaches its maximum bitterness depends upon many factors, but it can generally be stated that it will do so in from one to five hours at room temperatures and from five to twenty four hours at refrigerator temperatures. Since commercial juice products usually reach the consumer only after considerable delay, it is apparent that navel juices which become bitter and hence unpalatable are not suitable for utilization as canned juice or for products containing quantities of such juices.

Growers of navel oranges are for this reason deprived of a desirable products outlet for their fruit. Hence, any development permitting use to be made of navel oranges in products is of great importance to the citrus industry. Furthermore, the invention here disclosed will provide the consumer with an orange juice product which does not have the bitter flavor characteristics typical of processed navel juice.

Therefore, one of the objects of this invention is to permit use to be made of navel oranges in juice products form.

Another object is the provision of a method for maintaining navel juice in a nonbitter form in such a manner that substantially no bitterness will initially be present in the juice product as reconstituted by the consumer.

A further object of this invention is to retard bitterness development in order to permit dehydration of navel orange juice to obtain a new composition which, when reconstituted, will have the nutritional, flavor and color characteristics required of a citrus juice product.

Another object is to provide a method for treating navel orange juice which will permit the resulting product to undergo storage without deteriorating to a bitter inedible composition.

A further and more specific object is to produce a dehydrated orangeade which upon reconstitution will have the distinctive nonbitter flavor characteristics of the mature navel orange.

While it is believed that bitterness in navel orange juice is probably the result of limonin, a dilactone of undetermined structure having as its formula $C_{26}H_{30}O_8$, produced by cyclization of the free acid of limonin from the nonbitter water soluble potassium salt, a satisfactory method for removing or preventing bitterness has not until now been found. Although limonin is commonly accepted as being the bitter constituent of navel juices, other compounds such as nomilin and isolimonin may well be responsible in part or in whole for bitterness. In any event, irrespective of the exact nature of the bitter principle, I have found that development of bitterness in navel orange juice may be so controlled as to permit navel oranges to be satisfactorily processed for juice products.

I have discovered that the reaction resulting in the formation of limonin and other bitter principles and hence the development of bitterness in navel orange juice is completely reversible with change of pH and lapse of time. A freshly extracted navel juice which has been treated to increase its pH to about 7 develops no bitterness upon standing, while an untreated control sample will develop an unpalatable bitterness. If the pH of the control is then increased to about 7 it will slowly become nonbitter. Reacidification of either sample to a pH of approximately 3.7 will result in development of bitterness upon standing. The following table gives the results of tests verifying my theory of reversibility of bitterness:

TABLE 1

*Bitterness reversibility with pH changes*

| Sample | 1 | | 2 | |
|---|---|---|---|---|
| Treatment | Control pH 3.47 (held at 35° F. for 3 days) | | Adjusted to pH 7.02 with powdered anhydrous Na$_2$CO$_3$ (held at 35° F. for 3 days). | |
| Taste Test | Bitter | | Nonbitter | |

| Sample | 1A | 1B | 2A | 2B |
|---|---|---|---|---|
| Additional Treatment | Adjusted to pH 6.97 with powdered anhydrous Na$_2$CO$_3$. | Adjusted to pH 8.32 with anhydrous CaO. | Acidified to pH 3.65 with anhydrous citric acid. | Acidified to pH 3.65 with anhydrous citric acid. |
| Temperature | 73° F | 73° F | 73° F | 210° F. |
| Taste at time Zero (immediately after treatment) | Bitter | Bitter | Nonbitter | Nonbitter. |
| Taste after 30 minutes | do | Fairly bitter | do | Slightly Bitter. |
| Taste after 1 hour | do | Essentially Nonbitter | do | Fairly Bitter. |
| Taste after 2 hours | do | Nonbitter | do | Bitter. |
| Taste after 5 hours | Fairly Bitter | do | Slightly Bitter | Do. |
| Taste after 8 hours | Slightly Bitter | do | Fairly Bitter | Do. |
| Taste after 9 hours | Nonbitter | do | Bitter | Do. |

Not only has it been found that bitterness is reversible with change in pH, but it has also been found that varying degrees of pH adjustment will result in the formation of varying degrees of bitterness. In order to evaluate the ultimate level of bitterness reached by single strength navel orange juice adjusted to different pH values, the following procedure was followed. A sample of navel juice was divided into five different portions and each of four of these portions was treated by carefully adding concentrated sodium hydroxide solution to obtain different pH values. These juice samples were stored for three days at 35° F. then heated seventy minutes to a temperature of 140° F., cooled rapidly and stored for thirty-nine days at 35° F. in order to allow sufficient time for an equilibrium of bitterness to become established at each different pH level. At the end of the storage period sufficient concentrated sodium hydroxide solution and concentrated citric acid solution were added to each of the five juice samples to adjust them to the same pH and buffer salt (sodium citrate) level. By immediately taste-testing after this adjustment the only variable was bitterness (differences in pH and buffer salts having been eliminated) thus making for a more objective test for bitterness.

Table 2 gives the results of taste tests on samples of navel orange juice stored at varying pH levels.

TABLE 2

*Effect of pH on bitterness of navel orange juice*

| Sample No. | pH of Juice as Stored | pH of Juice as Taste-Tested | Summary of Results of Taste-Test by Five Tasters |
|---|---|---|---|
| (Control) 1 | 3.57 | 3.99 | Most Bitter. |
| 2 | 4.49 | 3.99 | Only Slightly Less Bitter Than Control. |
| 3 | 5.53 | 3.98 | Still Fairly Bitter. |
| 4 | 6.53 | 3.98 | Very Slight if any Bitterness. |
| 5 | 7.03 | 3.99 | Nonbitter. |

It is apparent from the above table that the greatest increment of change in bitterness in natural strength juice occurs betwen a pH of 5.53 and a pH of 6.53. While a natural strength juice which has had its pH adjusted to 5.5 is very noticeably less bitter than a pH unadjusted navel juice, the adjusted juice, though not objectionable for reasons of bitterness, is not satisfactory for consumption as such. Adjustment of pH to 5.5 removes the tart or slightly acid taste which is characteristic of citrus juice and makes it unsuitable for consumption. Thus, in order to make the juice satisfactory, it is necessary to restore acidity. This is easily accomplished in the laboratory by merely adding an edible acid such as citric or tartaric acid or monobasic calcium phosphate in the amount required. Contrary to expectations in the absence of knowledge of my discovery, the acidified juice does not immediately develop bitterness, but does so only at the approximate rate at which freshly extracted navel juice develops bitterness. Even though it is possible to prepare a single strength juice in the manner set forth, commercial utilization is not anticipated in view of the fact that high pH and low solids content accelerate deterioration and spoilage of the juice even under refrigerated conditions. Furthermore, problems of packaging, storing and distributing make commercialization impractical.

Notwithstanding the difficulties involved in use of single strength juice, my discovery does make possible the use of navel orange juice in a liquid product form. Freshly extracted navel juice which has had its pH adjusted to 5.5 can be concentrated to 75 to 90% solids in order to produce a dispenser type base. Because of the high solids content, the concentrated base is not subject to spoilage and deterioration due to its high pH if it is maintained under refrigeration at temperatures below 35° F. The concentrate can therefore be utilized in a refrigerated dispenser which simultaneously delivers the nonbitter juice, required acid, sugar syrup and water to the container from which the orange drink is to be consumed. Since this type of dispenser delivers a single serving which is generally consumed promptly, the product has no opportunity to develop the bitterness associated with processed navel juices.

Although my discovery may be employed to obtain essentially nonbitter navel juices in a liquid form which is commercially valuable as evidenced above, my invention is more particularly concerned with dehydrated navel juice products which may take the form of reconstitutable orange juice products or orangeade products. Irrespective of the final product form, however, preliminary treatment of the navel orange requires juice extraction and pH adjustment.

As is well known in the art, the extraction should be accomplished with as little maceration as possible since the precursors of limonin and other possible bitter principles are found in the albedo, the center bundle and the veins of the capillary membrane of the fruit and intimate contact of these portions after rupture with the acid juice results in a greater extraction of limonin and other bitter principle precursors into the juice and hence more bitterness tends to develop.

Adjustment of pH to the proper level can be accomplished in any of the well known ways without undesirably influencing the result. As indicated in Table 1, alkaline materials such as calcium oxide which react with the acid to form relatively insoluble calcium citrate salts may be used to reduce acidity, or alkaline materials such as sodium carbonate which form sodium citrate buffer salts may be used. Calcium carbonate, sodium bicarbonate or other alkaline materials instead of calcium oxide and sodium carbonate or a mixture of sodium and calcium carbonate, which has certain processing advantages as recognized by the art, may be employed. It is well known that it is possible to increase the pH of a solution by treatment with a basic anion exchange resin and this method may be alternately utilized if desired. It is evident that any method may be used which will give such pH levels as will retard development of bitterness. The particular procedure followed in neutralizing is not critical.

As already noted, Table 2 shows the bitterness level at different pH values. These results were based upon the treatment of a single strength juice and since the concentration of a solution results in an increase in the concentration of ions therein, the acidic juice will tend to have a slightly greater hydrogen ion concentration in concentrated juice than in single strength juice. Therefore, a natural strength juice which has an adjusted pH of 5.5 will upon concentration have a somewhat lower pH. The extent to which pH is decreased depends upon factors such as the presence and amount of buffer salts in the juice and the ionization constants of the various acids present as well as the degree of concentration.

In order to determine the effect of concentration upon change in pH and upon the bitterness of adjusted pH dehydrated juice it was necessary to perform further tests. Five crates of immature navel oranges were burred to remove their juice which was then screened and divided into five samples. The temperature of this juice was approximately 55° F. Four of these samples were carefully treated with sodium hydroxide solution to various pH levels. Each of the samples was then concentrated in a low temperature evaporator whose average temperature was 64° F. The samples were then spread on sugar and dried for five and a half hours in a vacuum shelf drier in which the shelf temperature was 120° F. Citric acid was then added to give a pH within the range of 3.5 to 4.0 upon reconstitution. Taste tests were performed on the reconstituted product with the results shown in Table 3.

After the pH is properly adjusted as above set forth, the juice may be concentrated and dried. Since the debittering concept discovered by me and set forth here has

TABLE 3

*Effect of juice pH adjustment on bitterness of navel orange juice concentrate and dried orangeade*

| Sample No. | Freshly Extracted Screened, Immature Navel Orange Juice | | pH of Juice After Adjustment with NaOH | Juice After Concentration | | | | Summary of Results of Taste-test on Dried Juice Adjusted to pH 3.5-4 As Reconstituted to 12.5 Brix |
|---|---|---|---|---|---|---|---|---|
| | Brix | pH | | Brix | pH | Summary of Results of Taste-Test | Change in pH from Adjustment to Concentration | |
| 1 | 12.22 | 3.42 | Control | 77.63 | 3.17 | Very Bitter | .25 | Bitter. |
| 2 | 12.27 | 3.42 | 4.50 | 78.06 | 4.24 | Less Bitter than Control. | .26 | Slightly Bitter. |
| 3 | 13.79 | 3.49 | 5.00 | 76.23 | 4.70 | Essentially Nonbitter. | .30 | Nonbitter. |
| 4 | 12.28 | 3.43 | 5.50 | 79.33 | 5.23 | Nonbitter | .27 | Do. |
| 5 | 12.20 | 3.43 | 6.50 | 81.88 | 6.08 | do | .42 | Do. |

Even though pH decreases upon concentration, the increased acidity at high concentrations results in no adverse effect upon bitterness level. A comparison of Table 3 with Table 2 indicates that adjustment to the same pH will result in different levels of bitterness depending upon whether the juice is maintained as a single strength juice or whether it is concentrated and dried immediately after adjustment of pH. In the latter event a lower pH may be utilized to produce a satisfactory taste than may be employed when the juice is maintained at a single strength basis. In view of the fact that both time and temperature in addition to hydrogen ion concentration are factors which influence the bitterness reaction, decreasing the time lapse from extraction and adjustment of pH to dryness, and maintaining a fairly low temperature, retards the bitterness development reaction to the extent that the ultimate degree of bitterness at a particular pH level is not attained. Since an aqueous phase is necessary for the bitter principal reaction to proceed, dehydration will result in a cessation of the reaction and the dry product will remain unchanged. As previously indicated and shown, the bitterness reaction requires time for its completion; the time depending upon temperature, pH and the character of the fruit. If dehydration is completed rapidly and at low temperature, the reaction producing bitterness at a particular pH will stop before the ultimate degree of bitterness can result. It can be seen that because of this, less adjustment of pH is required when low temperature short-time concentration and drying is practiced than when the fresh juice is treated at high temperature and without considering time.

Although time and temperature are factors influencing bitterness, they are secondary in comparison with pH as evidenced by the fact that it was not found possible to obtain by lyophilization a dehydrated juice that had decreased bitterness without prior adjustment of pH. Time and temperature through influencing the bitterness reaction can be effectively eliminated as factors in my process by utilizing the readily available low temperature vacuum evaporators well known by the art. They are not therefore limitative or controlling as a practical matter.

It will be apparent that in obtaining a dry product it is not necessary to adjust pH to the degree indicated by the results of Table 2. It is, of course, critical to adjust pH to that point which will permit obtaining a product which is not unpalatably bitter. Since the pH, which is throught critical, depends upon taste, it is not completely satisfactory to set forth an absolute limit. For practical purposes, however, it has been found that a pH of below 4.5 is undesirable when preparing a dehydrated product. The pH should therefore be adjusted to at least 4.5 in carrying out my invention.

no dependency upon the particular method of low temperature concentrating and drying, the manner of dehydrating is not critical. Where, for example, it is desired to have a dried product which has no added drying aids such as sugar, as where a dietetic organeade drink or orange juice product is to be the consumer product, any of the well known suitable low temperature methods such as continuous belt vacuum drying, puff drying, vacuum drum drying or lyophilization may be employed.

Subsequent treatment of the dried product requires only the addition of citric acid to restore about the original acidity of the product upon reconstitution with water. Mixing of the dried juice and crystalline citric acid may be desirable if the product is intended to be packaged as a homogeneous granular mixture or the citric acid may alternatively be separately packeted and included with the consumer package containing dried juice.

However, a preferred embodiment for the further treatment of the pH adjusted juice to effect concentration and drying to give a dehydrated product constitutes utilization of the process set forth in U. S. Patent No. 2,567,038 to Stevens et al. This method is most satisfactory in obtaining a nonbitter navel juice product destined for consumption as an orangeade drink. If this method is used, the procedure subsequent to pH adjustment as above set forth is concentration to 75 to 90% solids; mixing the concentrated juice with sufficient granular sugar to produce a moist mixture; vacuum drying to a moisture content of no more than 4% and adding crystalline citric acid. To obtain a moist mixture suitable for drying and having a desirable taste the concentrated juice is suspended on an amount of dry sugar corresponding to 88% to 55% of the weight of the product. The amount of citric acid to be added depends upon the taste desired in the reconstituted orangeade. For example, the pH of the reconstituted drink may vary between approximately 3.4 and 4.5 depending upon sugar content and taste preference. It has been discovered that it is not necessary to restore pH to the same degree as found in the original juice in order to obtain the desired tartness since tartness is a function of acid content as well as pH.

This orangeade product, however dried, may have various edible substances such as sugar, stabilized citrus oils and ascorbic acid added to it in order to enhance its flavor, stability and nutritive value. While the dry base may contain approximately from 10% to 35% of dehydrated navel juice, 88% to 58% of sugar, from 1% to 7% of added citric acid and small proportions, less than ½% of stabilizers and flavor intensifiers, the exact constitution depends upon the taste desired. If stabilizers and flavor intensifiers are not present, the base will contain the stated percentages of dehydrated juice and citric acid with the balance sugar. The reconstituted product of sample 3, Table 3, for example, contained 12.03 grams of dried orange juice product which was composed of 9.02 grams of dry cane sugar and 3.01 grams of dried navel orange juice solids and contained .47 gram of added anhydrous citric acid. This 12.5 grams of dry solids was reconstituted with 87.50 grams of water to obtain a finished drink of 12.5° Brix. Although the reconstituted beverage had a very satisfactory taste, it is possible to vary the percentages of the various constituents within the limits set forth above and still obtain a beverage which will be equally taste satisfying.

If the presence of sugar in the navel juice product is not desired, drying can be accomplished by utilization of continuous belt vacuum, puff drying or any of the methods already noted, and citric acid added to the dehydrated juice solids in such amounts as to satisfy the taste requirements of tartness. It has been determined that in order not to exceed the limit of desirable tartness the weight of citric acid added should be not more than 17% of the combined weight of citric acid and juice solids.

Irrespective of the manner of drying, it is necessary to point out that it is not absolutely essential to adjust pH prior to concentration. If the juice has unavoidably developed bitterness, it is possible to return the juice to its nonbitter condition. All that is necessary is that sufficient time be allowed to elapse after pH adjustment and prior to drying to effect the reversal of the reaction resulting in formation of the bitter principle so that bitterness is essentially absent. However, I prefer to adjust pH prior to concentration and as soon after extraction as feasible since it is not necessary to hold the juice at the adjusted pH for as long a period of time if the juice is treated after extraction and before bitterness has developed. Furthermore, if the juice has developed only partial bitterness the time for reversal to nonbitterness is less than if the juice had reached its ultimate bitterness level. In addition, it is not necessary to adjust the pH to as high a level as required when the juice has become bitter. The reason for this is that it is easier to retard the reaction than it is to reverse it. In any event, whether sufficient time has elapsed can be determined by a simple taste test.

Since the homogeneous dried product will have an acidity approximating that of the original juice upon reconstitution with water and since the development of bitterness is reversible with changing pH, it can be seen that bitterness will begin to develop from the time of reconstitution. The product should therefore be delivered to the ultimate consumer in a dry form and in packages of such size as to encourage prompt consumption of the reconstituted drink. The orange juice product or orangeade as reconstituted will not have the unfavorable bitter characteristics of navel orange juice products which have been stored and which make them undesirable for commercial use. Bitterness will develop in the reconstituted product only at about the same rate at which it would have developed in the original orange juice.

Having described my invention in such full, clear and exact terms as to enable others skilled in the art to practice it, I claim as my invention:

1. A process for producing nonbitter dehydrated navel orange juice which comprises extracting the juice from navel oranges, adjusting the pH of said juice before bitterness has developed to 5 to 7 to inhibit the development of bitterness, concentrating, dehydrating to a moisture content of less than 4% and adding citric acid sufficient to obtain a pH of from 3.4 to 4.5 upon reconstitution with water.

2. A process for treating navel orange juice which comprises adjusting the pH to within the range of 5 to 7 before bitterness has developed, concentrating to from 75 to 90% of solids, suspending the concentrated juice on a sufficient amount of granular sugar to obtain a moist granular mixture, dehydrating said mixture to obtain a dry mass having not more than 4% moisture, adding citrus oils and ascorbic acid to said mass in small proportions of less than ½% and adding sufficient citric acid to obtain a pH within the range of 3.4 to 4.5 upon reconstitution with water.

3. A process for preparing a dehydrated navel orangeade which comprises, adjusting the pH of navel orange juice to within the range of 4 to 7 before bitterness has developed, concentrating to from 75 to 90% of solids, suspending the concentrated juice on substantially dry granular sugar, vacuum drying, adding small proportions of citrus oils and ascorbic acid to enhance flavor and stability and adding citric acid.

4. A process for making a dehydrated navel orangeade base comprising adjusting the pH of freshly extracted navel orange juice to within the range of 5 to 7 before bitterness has developed, concentrating to from 75% to 90% of solids in a low temperature vacuum evaporator, suspending the concentrated juice on dry sugar, dehydrating to not more than 4% moisture and adding 1% to 7% citric acid.

5. A process for producing nonbitter, dehydrated navel orange juice which comprises extracting the juice from navel oranges, adjusting the pH of such juice to within the range of above 4.5 to 7 before bitterness has developed, concentrating, and drying to less than 4% moisture.

6. The process of claim 5 which includes the additional step of adding not more than 17% of citric acid to the dried juice.

7. The dehydrated navel orange juice produced by the process of claim 5.

8. A process for making a dehydrated navel orangeade-base product comprising adjusting the pH of freshly extracted navel orange juice to within the range of above 4.5 to 7 before bitterness has developed, concentrating the juice to from 75% to 90% of solids, suspending the concentrated juice on an amount of dry sugar corresponding to 88% to 55% of the weight of the product, drying to less than 4% moisture and adding an amount of citric acid corresponding to 1% to 7% by weight of the product.

9. The dehydrated navel orangeade base produced by the process of claim 8.

References Cited in the file of this patent

UNITED STATES PATENTS

| | | |
|---|---|---|
| 2,378,533 | Bering | June 19, 1945 |
| 2,567,038 | Stevens et al. | Sept. 14, 1951 |

UNITED STATES PATENT OFFICE

CERTIFICATE OF CORRECTION

Patent No. 2,834,687                                          May 13, 1958

Horton E. Swisher

It is hereby certified that error appears in the printed specification of the above numbered patent requiring correction and that the said Letters Patent should read as corrected below.

Column 5, line 59, for "through" read -- though --; line 70, for "throught" read -- thought --; column 8, line 20, for "4 to 7" read -- 5 to 7 --.

Signed and sealed this 5th day of August 1958.

(SEAL)
Attest:
KARL H. AXLINE
Attesting Officer

ROBERT C. WATSON
Commissioner of Patents